(12) United States Patent
Huang et al.

(10) Patent No.: US 12,135,410 B2
(45) Date of Patent: Nov. 5, 2024

(54) OPTICAL IMAGING LENS ASSEMBLY

(71) Applicant: Zhejiang Sunny Optics Co., Ltd., Yuyao (CN)

(72) Inventors: Lin Huang, Yuyao (CN); Yinghui Yuan, Yuyao (CN); Fujian Dai, Yuyao (CN); Liefeng Zhao, Yuyao (CN)

(73) Assignee: Zhejiang Sunny Optics Co., Ltd., Yuyao (CN)

( * ) Notice: Subject to any disclaimer, the term of this patent is extended or adjusted under 35 U.S.C. 154(b) by 755 days.

(21) Appl. No.: 17/239,739

(22) Filed: Apr. 26, 2021

(65) Prior Publication Data

US 2021/0364753 A1    Nov. 25, 2021

(30) Foreign Application Priority Data

May 20, 2020 (CN) .......................... 202010430110.7

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC .... G02B 13/04; G02B 13/0045; G02B 13/18; G02B 9/62
USPC ................................................ 359/756, 752
See application file for complete search history.

(56) References Cited

U.S. PATENT DOCUMENTS

| | | | |
|---|---|---|---|
| 2016/0223796 A1* | 8/2016 | Lee | G02B 9/62 |
| 2017/0276909 A1 | 9/2017 | Jung et al. | |
| 2018/0299649 A1* | 10/2018 | Hsu | G02B 9/62 |
| 2020/0057268 A1* | 2/2020 | Chen | G02B 27/0025 |
| 2021/0132338 A1* | 5/2021 | Lin | G02B 13/0045 |

FOREIGN PATENT DOCUMENTS

| | | | | |
|---|---|---|---|---|
| CN | 109541785 A | * | 3/2019 | ......... G02B 13/0015 |
| CN | 212207824 U | | 12/2020 | |
| JP | 6194134 B1 | | 9/2017 | |

* cited by examiner

*Primary Examiner* — Thomas K Pham
*Assistant Examiner* — Jennifer A Jones
(74) *Attorney, Agent, or Firm* — HAUPTMAN HAM, LLP

(57) ABSTRACT

An optical imaging lens assembly, along an optical axis from an object side to an image side, sequentially includes: a first to sixth lens each having a refractive power; an object-side surface of the third lens being a convex surface; the fourth lens having a negative refractive power; an object-side surface of the fifth lens being a concave surface; half of a maximal field-of-view Semi-FOV of the optical imaging lens assembly satisfying: Semi-FOV≥60°; a center thickness CT3 of the third lens on the optical axis and a spacing distance T12 between the first lens and the second lens on the optical axis satisfying: 2.5<CT3/T12<10.5; and a radius of curvature R5 of the object-side surface of the third lens and a radius of curvature R9 of the object-side surface of the fifth lens satisfying: −3.5<R5/R9<−2.0.

18 Claims, 8 Drawing Sheets

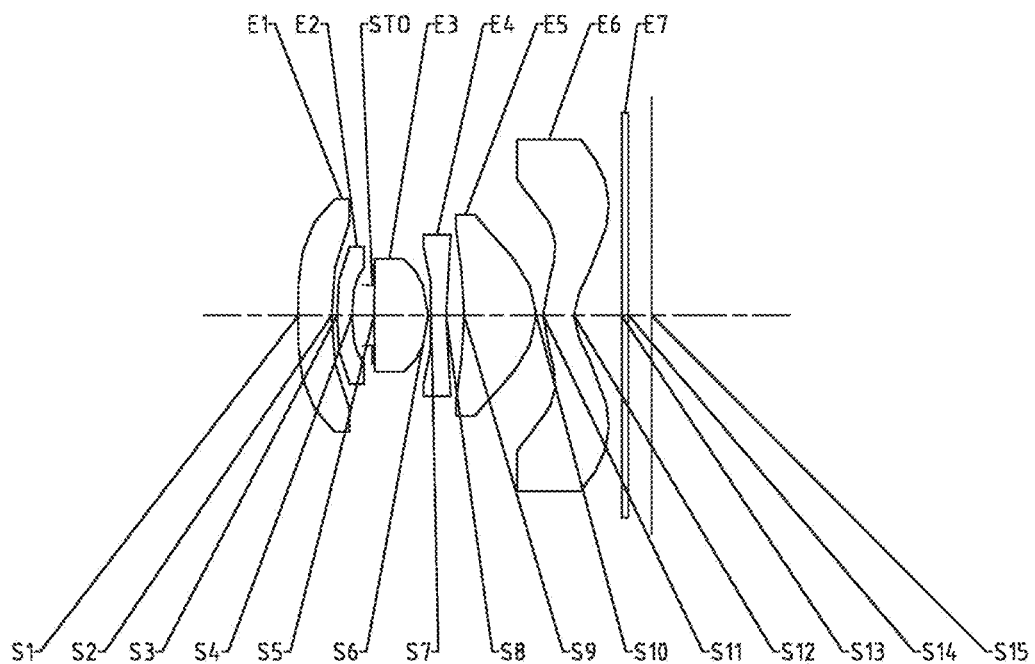
Fig. 1
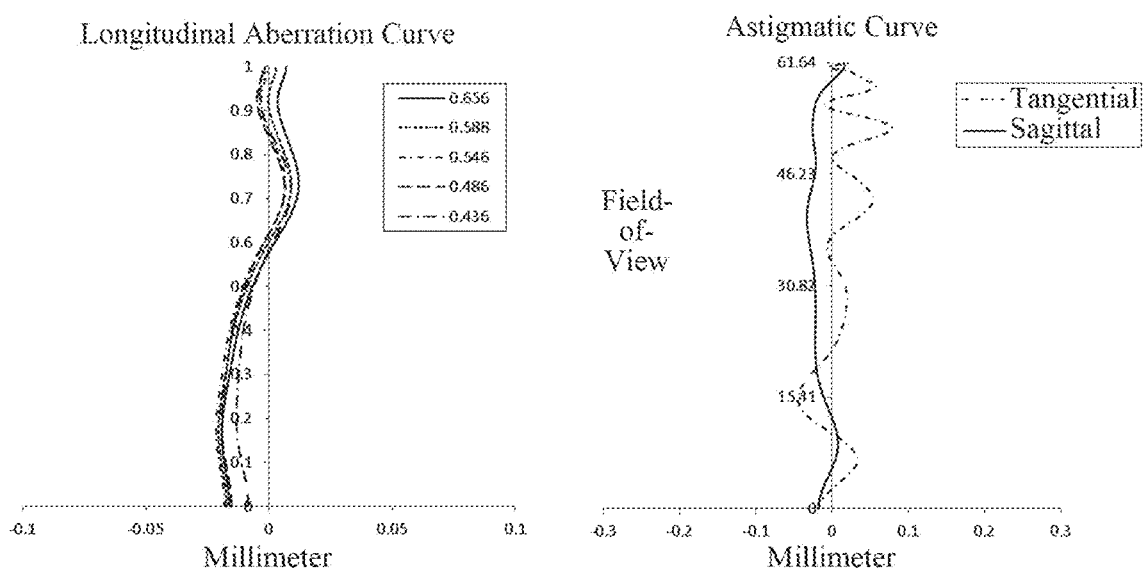
Fig. 2A                    Fig. 2B

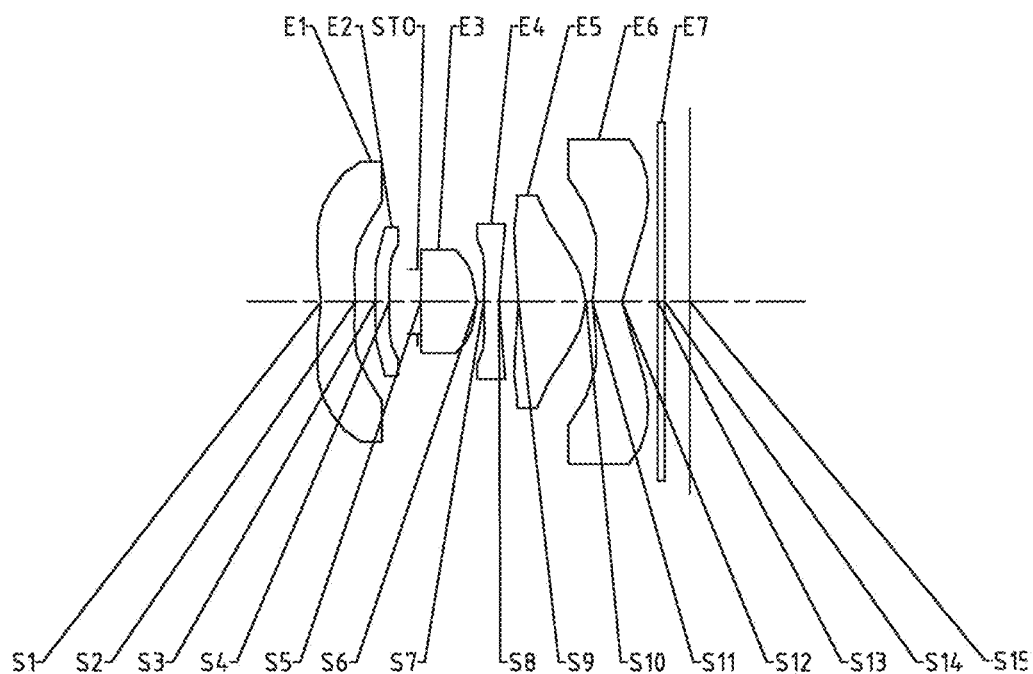
Fig. 5
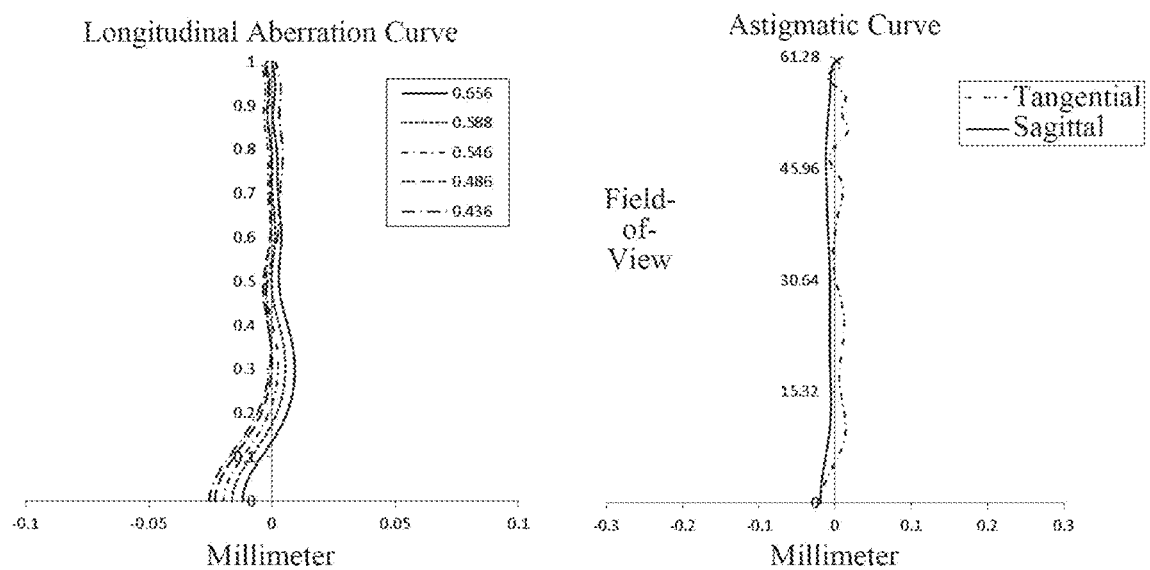
Fig. 6A
Fig. 6B

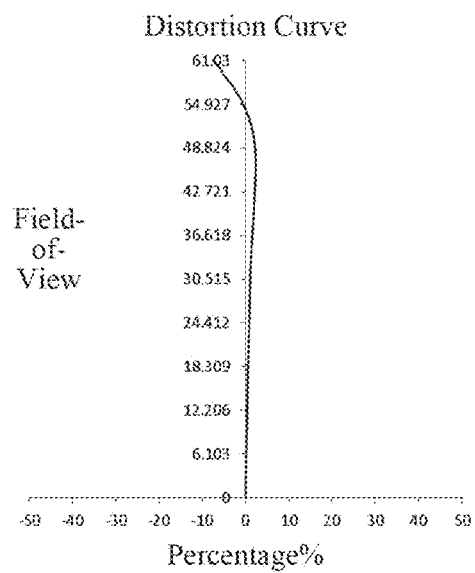 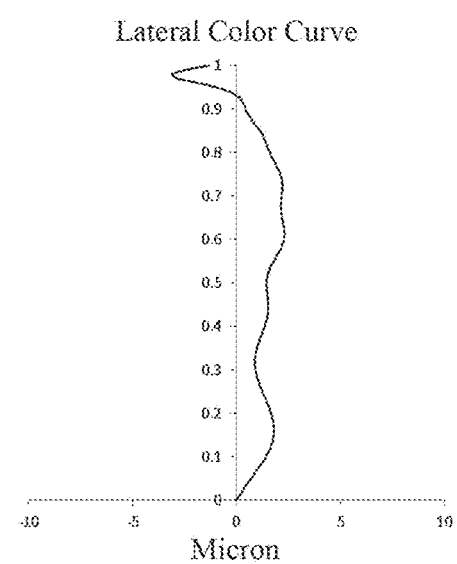
Fig. 10C
Fig. 10D

OPTICAL IMAGING LENS ASSEMBLY

CROSS-REFERENCE TO RELATED APPLICATIONS

This application claims the priority from Chinese Patent Application No. 202010430110.7, filed in the National Intellectual Property Administration (CNIPA) on May 20, 2020, the content of which is hereby incorporated by reference in its entirety.

TECHNICAL FIELD

The present disclosure relates to the field of optical elements, in particular, to an optical imaging lens assembly.

BACKGROUND

Nowadays, in life, portable electronic products such as smart phones are not only a communication device, but also a facility for daily entertainment. The photographing capability of the portable electronic products such as smart phones is one of the important functions that are paid attention to.

With the development of science and technology, the professionalism of the photographing capability of the portable electronic products such as smart phones gradually improves. Although ordinary standard lens assemblies are capable of imaging clearly in most cases, when photographing vast scenes such as tall buildings or mountains, the standard lens assemblies can only photograph a part of the scenes, but cannot show the grandeur and majestic momentum of the scenes.

SUMMARY

According to an aspect, embodiments of the present disclosure provide an optical imaging lens assembly. The optical imaging lens assembly, sequentially includes, along an optical axis from an object side to an image side: a first lens having a refractive power; a second lens having a refractive power; a third lens having a refractive power, an object-side surface of the third lens being a convex surface; a fourth lens having a negative refractive power; a fifth lens having a refractive power, an object-side surface of the fifth lens being a concave surface; and a sixth lens having a refractive power. Half of a maximal field-of-view Semi-FOV of the optical imaging lens assembly may satisfy: Semi-FOV≥60°; a center thickness CT3 of the third lens on the optical axis and a spacing distance T12 between the first lens and the second lens on the optical axis may satisfy: 2.5<CT3/T12<10.5; and a radius of curvature R5 of the object-side surface of the third lens and a radius of curvature R9 of the object-side surface of the fifth lens may satisfy: −3.5<R5/R9<−2.0.

In an embodiment, at least one of the surfaces from the object-side surface of the first lens to the image-side surface of the sixth lens is an aspheric mirror surface.

In an embodiment, a center thickness CT5 of the fifth lens on the optical axis and a center thickness CT2 of the second lens on the optical axis may satisfy: 4.0<CT5/CT2<5.5.

In an embodiment, a center thickness CT6 of the sixth lens on the optical axis and a spacing distance T56 between the fifth lens and the sixth lens on the optical axis may satisfy: 4.5<CT6/T56<6.5.

In an embodiment, a spacing distance T23 between the second lens and the third lens on the optical axis and a center thickness CT2 of the second lens on the optical axis may satisfy: 1.0<T23/CT2<2.5.

In an embodiment, the radius of curvature R9 of the object-side surface of the fifth lens and an effective focal length f5 of the fifth lens may satisfy: −3.5<R9/f5<−1.5.

In an embodiment, a radius of curvature R11 of an object-side surface of the sixth lens and an effective focal length f6 of the sixth lens may satisfy: −1.5<R11/f6≤−0.5.

In an embodiment, an effective focal length f3 of the third lens and an effective focal length f4 of the fourth lens may satisfy: −5.0<f4/f3<−2.0.

In an embodiment, a distance TTL from an object-side surface of the first lens to an image plane of the optical imaging lens assembly on the optical axis and half of a diagonal length ImgH of an effective pixel area on the image plane of the optical imaging lens assembly may satisfy: 1.5<TTL/ImgH<2.0.

In an embodiment, a spacing distance T23 between the second lens and the third lens on the optical axis, a spacing distance T34 between the third lens and the fourth lens on the optical axis, and a spacing distance T56 between the fifth lens and the sixth lens on the optical axis may satisfy: 2.0<T23/(T34+T56)<2.5.

In an embodiment, the first lens, the second lens, and the third lens may have a same refractive index.

According to another aspect, embodiments of the present disclosure provide an optical imaging lens assembly. The optical imaging lens assembly, along an optical axis from an object side to an image side sequentially includes: a first lens having a refractive power; a second lens having a refractive power; a third lens having a refractive power, an object-side surface of the third lens being a convex surface; a fourth lens having a negative refractive power; a fifth lens having a refractive power, an object-side surface of the fifth lens being a concave surface; and a sixth lens having a refractive power. A center thickness CT5 of the fifth lens on the optical axis and a center thickness CT2 of the second lens on the optical axis may satisfy: 4.0<CT5/CT2<5.5.

By properly distributing the refractive powers and optimizing the optical parameters, embodiments of the present disclosure provide an optical imaging lens assembly which has advantages such as miniaturization and good imaging quality and is suitable for portable electronic products.

BRIEF DESCRIPTION OF THE DRAWINGS

By reading detailed description of non-limiting embodiments with reference to the following accompanying drawings, other features, objectives and advantages of the present disclosure will be more apparent:

FIG. 1 is a schematic structural diagram illustrating an optical imaging lens assembly according to Embodiment 1 of the present disclosure;

FIGS. 2A-2D respectively illustrate a longitudinal aberration curve, an astigmatic curve, a distortion curve and a lateral color curve of the optical imaging lens assembly according to Embodiment 1;

FIG. 5 is a schematic structural diagram illustrating an optical imaging lens assembly according to Embodiment 3 of the present disclosure;

FIGS. 6A-6D respectively illustrate a longitudinal aberration curve, an astigmatic curve, a distortion curve and a lateral color curve of the optical imaging lens assembly according to Embodiment 3:

FIGS. 10A-10D respectively illustrate a longitudinal aberration curve, an astigmatic curve, a distortion curve and a lateral color curve of the optical imaging lens assembly according to Embodiment 5.

DETAILED DESCRIPTION OF EMBODIMENTS

Figure 2C:
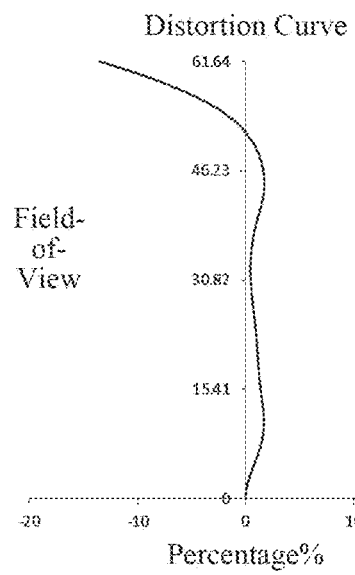

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first." "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In this text, the paraxial area refers to an area near the optical axis. If the surface of a lens is a convex surface and the position of the convex surface is not defined, it indicates that the surface of the lens is a convex surface at least in the paraxial area; and if the surface of a lens is a concave surface and the position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The features, principles, and other aspects of the present disclosure are described in detail below.

The optical imaging lens assembly according to exemplary implementations of the present disclosure may include six lenses having refractive powers, that is, a first lens, a second lens, a third lens, a fourth lens, a fifth lens and a sixth lens respectively. The six lenses are sequentially arranged from the object side to the image side along the optical axis. Any two adjacent lenses in the first lens to the sixth lens may have a spacing distance in between.

In an exemplary implementation, the first lens may have a positive refractive power or a negative refractive power; the second lens may have a positive refractive power or a negative refractive power; the third lens may have a positive refractive power or a negative refractive power, and an object-side surface of the third lens may be a convex surface; the fourth lens may have a negative refractive power; the fifth lens may have a positive refractive power or a negative refractive power, and an object-side surface of the fifth lens may be a concave surface; and the sixth lens may have a positive refractive power or a negative refractive power.

In an exemplary implementation, the optical imaging lens assembly may satisfy: Semi-FOV≥60°, where Semi-FOV is half of a maximal field-of-view of the optical imaging lens assembly. More specifically, Semi-FOV may further satisfy: Semi-FOV≥61°. Satisfying Semi-FOV≥60° is conducive to a wide field of view and may have a considerable range of clear view.

In an exemplary implementation, the optical imaging lens assembly may satisfy: 2.5<CT3/T12<10.5, where CT3 is a center thickness of the third lens on the optical axis, and T12 is a spacing distance between the first lens and the second lens on the optical axis. More specifically, CT3 and T12 may further satisfy: 2.7<CT3/T12<10.2. By satisfying 2.5<CT3/T12<10.5, the size of the optical imaging lens assembly is effectively reduced, excessive volume of the optical imaging lens assembly can be avoided, at the same time the assembly difficulty of the lenses is reduced, achieving a high space utilization rate.

In an exemplary implementation, the optical imaging lens assembly may satisfy: −3.5<R5/R9<−2.0, where R5 is a radius of curvature of the object-side surface of the third lens, and R9 is a radius of curvature of the object-side surface of the fifth lens. More specifically. R5 and R9 may further satisfy: $-3.2<R5/R9<-2.1$. Satisfying $-3.5<R5/R9<-2.0$ is conducive to reducing the sensitivity of the system, is conducive to achieving the characteristics of large field-of-view and high resolution, and at the same time is conducive to ensuring good manufacturability.

In an exemplary implementation, the optical imaging lens assembly may satisfy: $4.0<CT5/CT2<5.5$, where CT5 is a center thickness of the fifth lens on the optical axis, and CT2 is a center thickness of the second lens on the optical axis. More specifically, CT5 and CT2 may further satisfy: $4.3<CT5/CT2<5.5$. By satisfying $4.0<CT5/CT2<5.5$, the lenses are easy to be injection molded, the processability of the imaging system is improved, and at the same time good imaging quality is ensured.

In an exemplary implementation, the optical imaging lens assembly may satisfy: $4.5<CT6/T56<6.5$, where CT6 is a center thickness of the sixth lens on the optical axis, and T56 is a spacing distance between the fifth lens and the sixth lens on the optical axis. More specifically, CT6 and T56 may further satisfy: $4.5<CT6/T56<6.3$. By satisfying $4.5<CT6/T56<6.5$, the size of the optical imaging lens assembly can be effectively reduced, excessive volume of the optical imaging lens assembly is avoid, at the same time the assembly difficulty of the lenses can be reduced, achieving a high space utilization rate.

In an exemplary implementation, the optical imaging lens assembly may satisfy: $1.0<T23/CT2<2.5$, where T23 is a spacing distance between the second lens and the third lens on the optical axis, and CT2 is the center thickness of the second lens on the optical axis. More specifically, T23 and CT2 may further satisfy: $1.3<T23/CT2<2.3$. By satisfying $1.0<T23/CT2<2.5$, processing and assembly characteristics are ensured, and problems such as interference between front and rear lenses in the assembly process due to too small gaps are avoided; at the same time, it is beneficial to reduce light deflection, adjust the field curvature of the optical imaging lens assembly, reduce the sensitivity, and thus obtain better imaging quality.

In an exemplary implementation, the optical imaging lens assembly may satisfy: $-3.5<R9/f5<-1.5$, where R9 is the radius of curvature of the object-side surface of the fifth lens, and f5 is an effective focal length of the fifth lens. More specifically, R9 and f5 may further satisfy: $-3.1<R9/f5<-1.6$. By satisfying $-3.5<R9/f5<-4.5$, the field curvature and distortion of the optical imaging lens assembly may be improved, and the processing difficulty of the fifth lens may be controlled at the same time.

In an exemplary implementation, the optical imaging lens assembly may satisfy: $-1.5<R11/f6<-0.5$, where R11 is a radius of curvature of an object-side surface of the sixth lens, and f6 is an effective focal length of the sixth lens. More specifically, R11 and f6 may further satisfy: $-1.1<R11/f6<-0.5$. By satisfying $-1.5<R11/f6<-0.5$, the field curvature and distortion of the optical imaging lens assembly is improved, and at the same time the processing difficulty of the sixth lens is controlled.

In an exemplary implementation, the optical imaging lens assembly may satisfy: $-5.0<f4/f3<-2.0$, where f3 is an effective focal length of the third lens, and f4 is an effective focal length of the fourth lens. More specifically, f4 and f3 may further satisfy: $-4.8<f4/f3<-2.0$. Satisfying $-5.0<f4/f3<-2.0$ is beneficial to the optical imaging lens assembly to better balance aberrations, and at the same time is beneficial to improve the resolution of the system.

In an exemplary implementation, the optical imaging lens assembly may satisfy: $1.5<TTL/ImgH<2.0$, where TTL is a distance from an object-side surface of the first lens to an image plane of the optical imaging lens assembly on the optical axis, and ImgH is half of a diagonal length of an effective pixel area on the image plane of the optical imaging lens assembly. Satisfying $1.5<TTL/ImgH<2.0$ is conducive to achieving a large imaging height while achieving a short total track length, is conducive to miniaturization of the lens assembly, and is conducive to improving the imaging quality.

In an exemplary implementation, the optical imaging lens assembly may satisfy: $2.0<T23/(T34+T56)<2.5$, where T23 is the spacing distance between the second lens and the third lens on the optical axis. T34 is a spacing distance between the third lens and the fourth lens on the optical axis, and T56 is a spacing distance between the fifth lens and the sixth lens on the optical axis. Satisfying $2.0<T23/(T34+T56)<2.5$ is conducive to reducing the assembly difficulty of the lenses.

In an exemplary implementation, the first lens, the second lens, and the third lens may have the same refractive index.

In an exemplary implementation, the optical imaging lens assembly may further include a diaphragm arranged between the second lens and the third lens. Alternatively, the above optical imaging lens assembly may further include an optical filter for correcting the color deviation and/or a cover glass for protecting the photosensitive element located on the image plane. Embodiments of the present disclosure proposes an optical imaging lens assembly having the characteristics of miniaturization, large angle-of-view, long depth of field, high resolution, and high imaging quality. The optical imaging lens assembly according to the above implementations of the present disclosure may use a plurality of lenses, for example, six lenses as described in the preceding text. By properly distributing the refractive power of each lens, types of surfaces of each lens, the center thickness of each lens and the axis distance between the lenses, etc., it may effectively converge incident light, reduce the total track length of the imaging lens assembly and improve the processability of the imaging lens assembly, making the optical imaging lens assembly more conducive to production and processing.

In the implementations of the present disclosure, at least one of the mirror surfaces of the lenses is an aspheric mirror surface, that is, at least one of the mirror surfaces from the object-side surface of the first lens to an image-side surface of the sixth lens is an aspheric mirror surface. The characteristic of the aspheric lens is: the curvature is continuously changing from the center of the lens to the periphery of the lens. Unlike the spherical lens with a constant curvature from the center of the lens to the periphery, the aspheric lens has a better radius of curvature characteristic, having advantages of improving the distortion aberration and improving the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, and the sixth lens is an aspheric mirror surface. Alternatively, the object-side surface and the image-side surface of each of the first lens, the second lens, the third lens, the fourth lens, the fifth lens, and the sixth lens both are aspheric mirror surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having six lenses is described as an example in the implementations, the optical imaging lens assembly is not limited to include six lenses. If desired, the optical imaging lens assembly may also include other numbers of lenses.

Embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2D. FIG. 1 is a schematic structural diagram illustrating the optical imaging lens assembly according to Embodiment 1 of the present disclosure.

As shown in FIG. 1, the optical imaging lens assembly from an object side to an image side sequentially includes a first lens E1, a second lens E2, a diaphragm STO, a third lens E3, a fourth lens E4, a fifth lens E5, a sixth lens E6, an optical filter E7 and an image plane S15.

The first lens E1 has a positive refractive power, an object-side surface S1 of the first lens E1 is a convex surface, and an image-side surface S2 of the first lens E1 is a convex surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The optical filter E7 has an object-side surface S13 and an image-side surface S14. Light from an object passes through the surfaces S1 to S14 sequentially and finally forms an image on the image plane S15.

Table 1 shows a table of basic parameters of the optical imaging lens assembly in Embodiment 1. The radius of curvature, the thickness/distance and the focal length are shown in millimeters (mm).

TABLE 1

| surface number | surface type | radius of curvature | thickness/distance | refractive index | abbe number | focal length | conic coefficient |
|---|---|---|---|---|---|---|---|
| OBJ | spherical | infinite | infinite | | | | |
| S1 | aspheric | infinite | 0.5595 | 1.55 | 56.1 | 9149.13 | −99.0000 |
| S2 | aspheric | infinite | 0.0896 | | | | 2.5203 |
| S3 | aspheric | 13.2161 | 0.2500 | 1.55 | 56.1 | −8.71 | 32.8379 |
| S4 | aspheric | 3.4756 | 0.3376 | | | | 8.6970 |
| STO | spherical | infinite | 0.0307 | | | | |
| S5 | aspheric | 12.6308 | 0.9042 | 1.55 | 56.1 | 2.38 | −80.5353 |
| S6 | aspheric | −1.4140 | 0.0486 | | | | 0.5044 |
| S7 | aspheric | −84.6226 | 0.2500 | 1.68 | 19.2 | −5.56 | 98.0441 |
| S8 | aspheric | 3.9575 | 0.2995 | | | | −6.3913 |
| S9 | aspheric | −5.8756 | 1.2060 | 1.55 | 56.1 | 2.05 | −6.8328 |
| S10 | aspheric | −1.0082 | 0.1127 | | | | −1.0199 |
| S11 | aspheric | 1.5352 | 0.5135 | 1.67 | 20.4 | −3.07 | −1.0329 |
| S12 | aspheric | 0.7607 | 0.7995 | | | | −1.0032 |
| S13 | spherical | infinite | 0.1100 | 1.52 | 64.2 | | |
| S14 | spherical | infinite | 0.3913 | | | | |
| S15 | spherical | infinite | | | | | |

In this example, the total effective focal length f of the optical imaging lens assembly is 2.25 mm, the total track length TTL of the optical imaging lens assembly (that is, the distance on the optical axis from the object-side surface S1 of the first lens E1 to the image plane S15 of the optical imaging lens assembly) is 5.90 mm, half of the diagonal length of the effective pixel area on the image plane S15 of the optical imaging lens assembly ImgH is 3.63 mm, half of the maximal field-of-view of the optical imaging lens assembly Semi-FOV is 61.6°, and the aperture value of the optical imaging lens assembly Fno is 2.28.

In Embodiment 1, the object-side surface and the image-side surface of any one of the first lens E1 to the sixth lens E6 are aspheric surfaces, and the surface type x of each aspheric lens may be defined by but not limited to the following aspheric formula:

$$x = \frac{ch^2}{1 + \sqrt{1 - (k+1)c^2h^2}} + \sum A_i h^i \quad (1)$$

Figure 3:
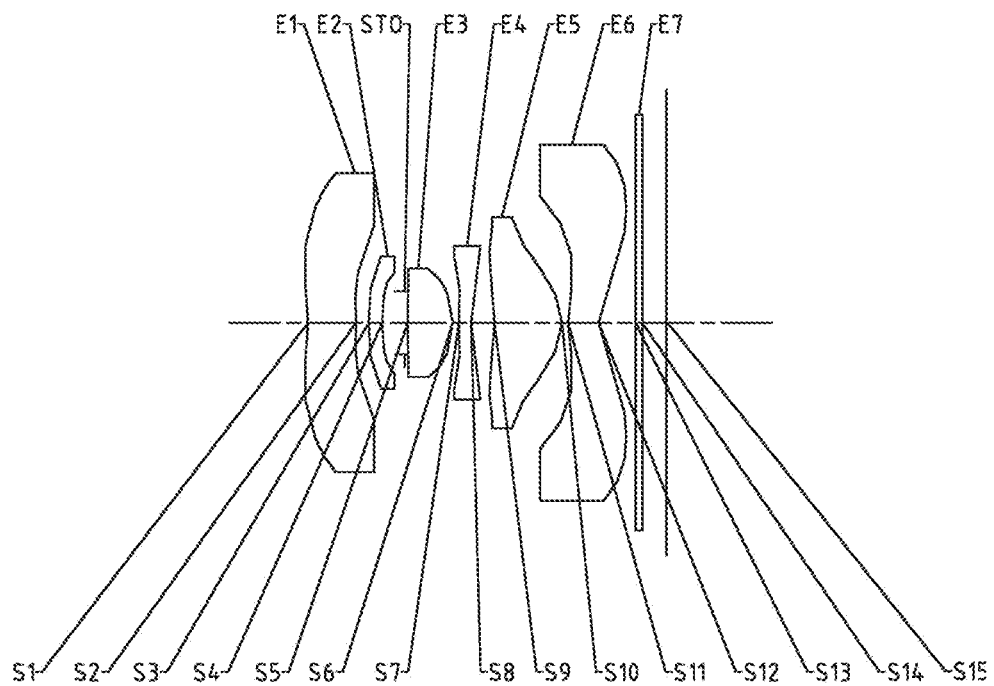
FIG. 3 is a schematic structural diagram illustrating an optical imaging lens assembly according to Embodiment 2 of the present disclosure.

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of the i$^{th}$ order of the aspheric surface. Tables 2-1 and 2-2 below give the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S12 in Embodiment 1.

will be omitted. FIG. 3 is a schematic structural diagram illustrating the optical imaging lens assembly according to Embodiment 2 of the present disclosure.

As shown in FIG. 3, the optical imaging lens assembly from an object side to an image side sequentially includes a first lens E1, a second lens E2, a diaphragm STO, a third lens

TABLE 2-1

| surface number | A4 | A6 | A8 | A10 | A12 | A14 | A16 |
|---|---|---|---|---|---|---|---|
| S1 | 7.7289E−02 | −8.9255E−02 | 2.9818E−01 | −6.8993E−01 | 1.0548E+00 | −1.1137E+00 | 8.3504E−01 |
| S2 | 1.9331E−01 | −2.9879E−01 | 1.6214E+00 | −6.5571E+00 | 1.6618E+01 | −2.8290E+01 | 3.3712E+01 |
| S3 | 3.1160E−01 | −1.9585E+00 | 1.6105E+01 | −8.7125E+01 | 3.1462E+02 | −7.9135E+02 | −1.4243E+03 |
| S4 | 3.3735E−02 | 6.4982E+00 | −1.5808E+02 | 2.3284E+03 | −2.2405E+04 | 1.4746E+05 | −6.8327E+05 |
| S5 | 1.2109E−02 | −4.0071E+00 | 2.1691E+02 | −6.6492E+03 | 1.2805E+05 | −1.6530E+06 | −1.4857E+07 |
| S6 | 4.0355E−01 | −5.7116E+00 | 5.4679E+01 | −3.3830E+02 | 1.3881E+03 | −3.8737E+03 | 7.3202E+03 |
| S7 | 6.7343E−02 | −2.7392E+00 | 2.3519E+01 | −1.2091E+02 | 4.0955E+02 | −9.6970E+02 | 1.6671E+03 |
| S8 | −1.7692E−01 | 1.0863E−01 | 7.2223E−01 | −1.9683E+00 | −1.5080E+00 | 1.7003E+01 | −4.0768E+01 |
| S9 | 9.0759E−02 | −4.3895E−01 | 7.7862E−01 | 1.8514E−01 | −3.3753E+00 | 7.0494E+00 | −8.1623E+00 |
| S10 | 4.5972E−01 | −1.6463E+00 | 4.1540E+00 | −7.6050E+00 | 1.0191E+01 | −1.0115E+01 | 7.5460E+00 |
| S11 | 5.8416E−02 | −6.8885E−01 | 1.1570E+00 | −1.1965E+00 | 8.2832E−01 | −3.7250E−01 | 9.1424E−02 |
| S12 | −4.3722E−01 | 2.1505E−01 | −4.6246E−02 | −2.9131E−02 | 3.4478E−02 | −1.8208E−02 | 6.2161E−03 |

TABLE 2-2

| surface number | A18 | A20 | A22 | A24 | A26 | A28 | A30 |
|---|---|---|---|---|---|---|---|
| S1 | −4.5093E−01 | 1.7581E−01 | −4.9026E−02 | 9.5346E−03 | −1.2288E−03 | 9.4383E−05 | −3.2745E−06 |
| S2 | −2.8729E+01 | 1.7635E+01 | −7.7456E+00 | 2.3773E+00 | −4.8458E−01 | 5.8962E−02 | −3.2413E−03 |
| S3 | −1.8576E+03 | 1.7544E+03 | −1.1827E+03 | 5.5090E+02 | −1.6665E+02 | 2.8956E+01 | −2.1271E+00 |
| S4 | 2.2647E+06 | −5.3908E+06 | 9.1376E+06 | −1.0757E+07 | 8.3543E+06 | −3.8461E+06 | 7.9448E+05 |
| S5 | −9.4878E+07 | 4.3322E+08 | −1.4040E+09 | 3.1521E+09 | −4.6586E+09 | 4.0741E+09 | −1.5963E+09 |
| S6 | −8.7591E+03 | 4.6992E+03 | 3.5820E+03 | −9.3284E+03 | 8.2204E+03 | −3.6257E+03 | 6.6588E+02 |
| S7 | −2.1260E+03 | 2.0246E+03 | −1.4276E+03 | 7.2515E+02 | −2.5103E+02 | 5.2979E+01 | −5.1380E+00 |
| S8 | 5.5157E+01 | −4.8394E+01 | 2.8615E+01 | −1.1364E+01 | 2.9117E+00 | −4.3512E−01 | 2.8796E−02 |
| S9 | 6.1487E+00 | −3.1595E+00 | 1.1145E+00 | −2.6363E−01 | 3.9381E−02 | −3.2641E−03 | 1.0760E−04 |
| S10 | −4.2731E+00 | 1.8345E+00 | −5.8698E−01 | 1.3508E−01 | −2.1016E−02 | 1.9705E−03 | −8.3825E−05 |
| S11 | 1.0837E−03 | −9.5354E−03 | 3.6168E−03 | −7.2806E−04 | 8.6765E−05 | −5.7876E−06 | 1.6730E−07 |
| S12 | −1.4809E−03 | 2.5143E−04 | −3.0332E−05 | 2.5400E−06 | −1.4026E−07 | 4.5883E−09 | −6.7252E−11 |

Figure 2D:
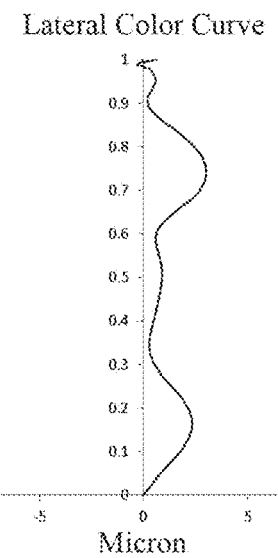

FIG. 2A shows the longitudinal aberration curve of the optical imaging lens assembly according to Embodiment 1, representing deviations of focal points where lights of different wavelengths converged after passing through the lens assembly. FIG. 2B shows the astigmatic curve of the optical imaging lens assembly according to Embodiment 1, representing a curvature of the tangential image plane and a curvature of the sagittal image plane. FIG. 2C shows the distortion curve of the optical imaging lens assembly according to Embodiment 1, representing amounts of distortion at different viewing angles. FIG. 2D shows the lateral color curve of the optical imaging lens assembly according to Embodiment 1, representing deviations of different image heights on the image plane after lights pass through the lens assembly. It can be seen from FIG. 2A to FIG. 2D that the optical imaging lens assembly given in Embodiment 1 can achieve a good imaging quality.

Embodiment 2

An optical imaging lens assembly according to Embodiment 2 of the present disclosure is described below with reference to FIGS. 3-4D. In the present embodiment and the following embodiments, for the purpose of brevity, the description of the parts similar to those in Embodiment 1

E3, a fourth lens E4, a fifth lens E5, a sixth lens E6, an optical filter E7 and an image plane S15.

The first lens E1 has a positive refractive power, an object-side surface S1 of the first lens E1 is a concave surface, and an image-side surface S2 of the first lens E1 is a convex surface. The second lens E2 has a negative refractive power, an object-side surface S3 of the second lens E2 is a concave surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The optical filter E7 has an object-side surface S13 and an image-side surface S14. Light from an object passes through the surfaces S1 to S14 sequentially and finally forms an image on the image plane S15.

In this example, the total effective focal length f of the optical imaging lens assembly is 2.10 mm, the total track length TTL of the optical imaging lens assembly is 5.85 mm, half of the diagonal length of the effective pixel area on the image plane S15 of the optical imaging lens assembly ImgH is 3.63 mm, half of the maximal field-of-view Semi-FOV of the optical imaging lens assembly is 61.5°, and the aperture value of the optical imaging lens assembly Fno is 2.28.

Table 3 shows a table of basic parameters of the optical imaging lens assembly in Embodiment 2. The radius of curvature, the thickness/distance and the focal length are shown in millimeters (mm). Table 4-1 and 4-2 show the high-order coefficients applicable to the aspheric surfaces in Embodiment 2. Each aspheric surface type may be defined by the formula (1) given in the above Embodiment 1.

TABLE 3

| surface number | surface type | radius of curvature | thickness/ distance | Material refractive index | Material abbe number | focal length | conic coefficient |
|---|---|---|---|---|---|---|---|
| OBJ | spherical | infinite | infinite | | | | |
| S1 | aspheric | −3.1742 | 0.7859 | 1.55 | 56.1 | 2495.70 | −27.8821 |
| S2 | aspheric | −3.4439 | 0.2066 | | | | −89.3044 |
| S3 | aspheric | −29.0000 | 0.2200 | 1.55 | 56.1 | −10.43 | −99.0000 |
| S4 | aspheric | 7.1141 | 0.3627 | | | | 69.1101 |
| STO | spherical | infinite | 0.0514 | | | | |
| S5 | aspheric | 9.6327 | 0.7358 | 1.55 | 56.1 | 2.39 | 90.8832 |
| S6 | aspheric | −1.4696 | 0.1000 | | | | 0.8420 |
| S7 | aspheric | 5.0277 | 0.2000 | 1.68 | 19.2 | −10.75 | −98.2894 |
| S8 | aspheric | 2.9304 | 0.3808 | | | | −3.8547 |
| S9 | aspheric | −3.6375 | 1.1004 | 1.55 | 56.1 | 1.87 | −36.7197 |
| S10 | aspheric | −0.8840 | 0.1000 | | | | −1.2730 |
| S11 | aspheric | 2.2421 | 0.5000 | 1.67 | 20.4 | −2.12 | −0.6082 |
| S12 | aspheric | 0.7903 | 0.6010 | | | | −0.9896 |
| S13 | spherical | infinite | 0.1100 | 1.52 | 64.2 | | |
| S14 | spherical | infinite | 0.3919 | | | | |
| S15 | spherical | infinite | | | | | |

TABLE 4-1

| surface number | A4 | A6 | A8 | A10 | A12 | A14 | A16 |
|---|---|---|---|---|---|---|---|
| S1 | 7.2399E−02 | −2.7497E−02 | 7.7603E−03 | −5.5510E−04 | −5.3637E−04 | 2.2608E−04 | −4.2051E−05 |
| S2 | 3.0876E−01 | −4.5351E−01 | 1.2085E+00 | −3.0039E+00 | 5.3834E+00 | −6.3420E+00 | 4.4850E+00 |
| S3 | 7.7969E−01 | −4.3933E+00 | 3.1525E+01 | −1.9286E+02 | 8.9721E+02 | −3.0593E+03 | 7.6065E+03 |
| S4 | 6.4702E−01 | −1.1025E+01 | 2.0592E+02 | −2.6856E+03 | 2.4111E+04 | −1.5158E+05 | 6.7995E+05 |
| S5 | −1.0444E+00 | −1.5237E+00 | 5.2490E+01 | −1.0695E+03 | 1.3610E+04 | −1.1575E+05 | 6.8239E+05 |
| S6 | 5.5284E−02 | −6.0958E+00 | 1.1324E+02 | −1.2632E+03 | 9.4188E+03 | −4.8977E+04 | 1.8185E+05 |
| S7 | −1.5836E−01 | −3.7566E−01 | 2.0858E+00 | 4.6965E+00 | −9.0190E+01 | 4.7613E+02 | −1.4925E+03 |
| S8 | −5.2552E−02 | −7.2235E−01 | 4.4097E+00 | −1.5811E+01 | 4.0449E+01 | −7.5715e+01 | 1.0326E+02 |
| S9 | 5.0095E−02 | −3.4848E−01 | 1.2419E+00 | −2.8868E+00 | 4.8938E+00 | −6.0235E+00 | 5.3667E+00 |
| S10 | 4.2442E−01 | −1.5577E+00 | 4.1022E+00 | −7.5228E+00 | 9.7610E+00 | −9.0686E+00 | 6.0695E+00 |
| S11 | −2.4938E−02 | −1.0471E+00 | 2.9949E+00 | −5.0069E+00 | 5.6808E+00 | −4.5927E+00 | 2.7069E+00 |
| S12 | −7.0886E−01 | 7.5972E−01 | −6.6415E−01 | 4.3767E−01 | −2.1477E−01 | 7.8743E−02 | −2.1667E−02 |

TABLE 4-2

| surface number | A18 | A20 | A22 | A24 | A26 | A28 | A30 |
|---|---|---|---|---|---|---|---|
| S4 | 4.0095E−06 | −1.5923E−07 | 0.0000E+00 | 0.0000E+00 | 0.0000E+00 | 0.0000E+00 | 0.0000E+00 |
| S2 | −1.4338E+00 | −3.7952E−01 | 6.1047E−01 | −2.8870E−01 | 7.2822E−02 | −9.8488E−03 | 5.6335E−04 |
| S3 | −1.3803E+04 | 1.8211E+04 | −1.7242E+04 | 1.1396E+04 | −4.9870E+03 | 1.2972E+03 | −1.5175E+02 |
| S4 | −2.2007E+06 | 5.1465E+06 | −8.6087E+06 | 1.0036E+07 | −7.7410E+06 | 3.548813E+06 | −7.3188E+05 |
| S5 | −2.8361E+06 | 8.3167E+06 | −1.6953E+07 | 2.3181E+07 | −1.9832E+07 | 9.2016E+06 | −1.5986E+06 |
| S6 | −4.8789E+05 | 9.4698E+05 | −1.3158E+06 | 1.2747E+06 | −8.1707E+05 | 3.1115E+05 | −5.3259E+04 |
| S7 | 3.1362E+03 | −4.5831E+03 | 4.6805E+03 | −3.2794E+03 | 1.5023E+03 | −4.0520E+02 | 4.8758E+01 |
| S8 | −1.0118E+02 | 6.9314E+01 | −3.1344E+01 | 8.0819E+00 | −5.3927E−01 | −2.5877E−01 | 5.1385E−02 |
| S9 | −3.4738E+00 | 1.6347E+00 | −5.5408E−01 | 1.3180E−01 | −2.0848E−02 | 1.9612E−03 | −8.2399E−05 |
| S10 | −2.9051E+00 | 9.6849E−01 | −2.1162E−01 | 2.5845E−02 | −6.4094E−04 | −2.3010E−04 | 2.0873E−05 |
| S11 | −1.1739E+00 | 3.7394E−01 | −8.6338E−02 | 1.4039E−02 | −1.5223E−03 | 9.8691E−05 | −2.8900E−06 |
| S12 | 4.4763E−03 | −6.8989E−04 | 7.8070E−05 | −6.2930E−06 | 3.4178E−07 | −1.1203E−08 | 1.6730E−10 |

Figure 4A:
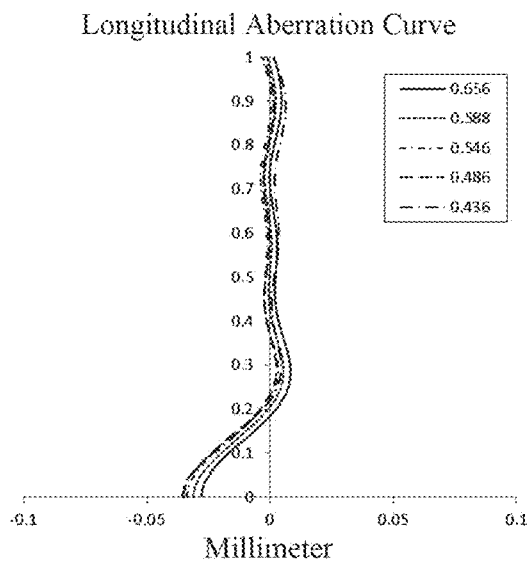
FIGS. 4A-4D respectively illustrate a longitudinal aberration curve, an astigmatic curve, a distortion curve and a lateral color curve of the optical imaging lens assembly according to Embodiment 2.
Figure 4B:
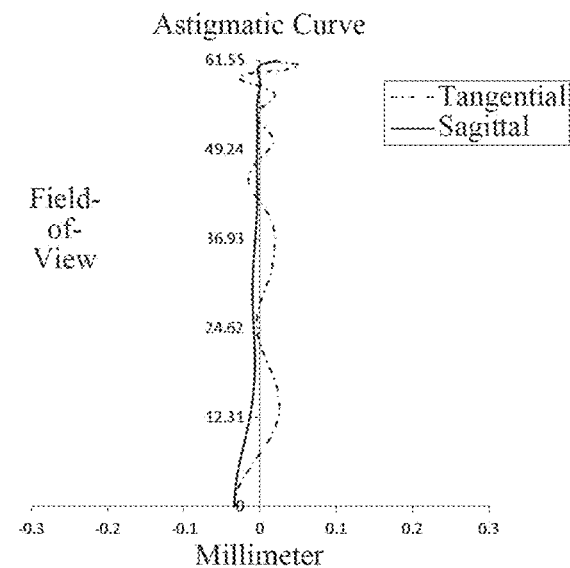
Figure 4C:
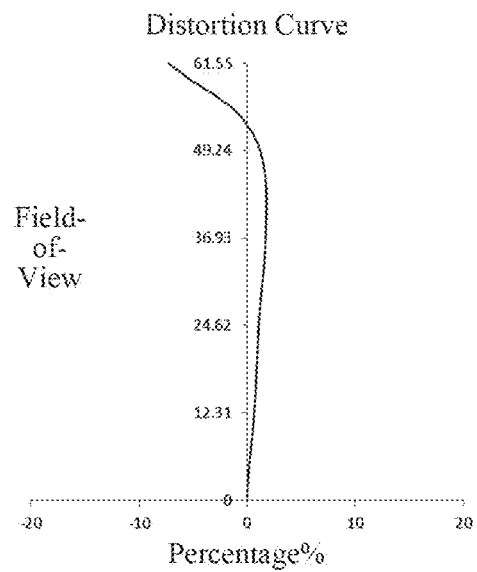
Figure 4D:
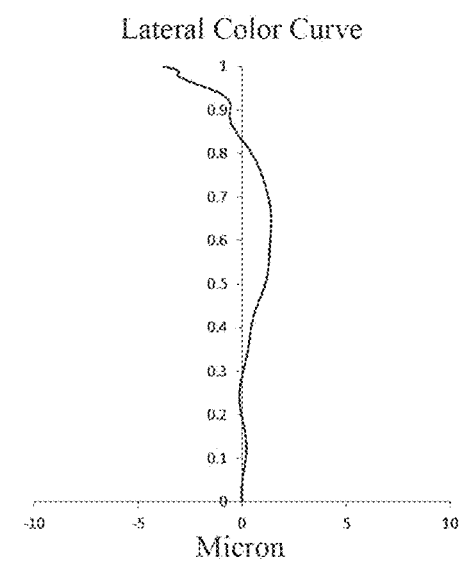

FIG. 4A shows the longitudinal aberration curve of the optical imaging lens assembly according to Embodiment 2, representing deviations of focal points where lights of different wavelengths converged after passing through the lens assembly. FIG. 4B shows the astigmatic curve of the optical imaging lens assembly according to Embodiment 2, representing a curvature of the tangential image plane and a curvature of the sagittal image plane. FIG. 4C shows the distortion curve of the optical imaging lens assembly according to Embodiment 2, representing amounts of distortion at different viewing angles. FIG. 4D shows the lateral color curve of the optical imaging lens assembly according to Embodiment 2, representing deviations of different image heights on the image plane after lights pass through the lens assembly. It can be seen from FIG. 4A to FIG. 4D that the optical imaging lens assembly given in Embodiment 2 can achieve a good imaging quality.

Embodiment 3

An optical imaging lens assembly according to Embodiment 3 of the present disclosure is described below with reference to FIGS. 5-6D. FIG. 5 is a schematic structural diagram illustrating the optical imaging lens assembly according to Embodiment 3 of the present disclosure.

As shown in FIG. 5, the optical imaging lens assembly from an object side to an image side sequentially includes a first lens E1, a second lens E2, a diaphragm STO, a third lens E3, a fourth lens E4, a fifth lens E5, a sixth lens E6, an optical filter E7 and an image plane S15.

The first lens E1 has a negative refractive power, an object-side surface S1 of the first lens E1 is a concave surface, and an image-side surface S2 of the first lens E1 is a convex surface. The second lens E2 has a negative refractive power, an object-side surface S3 of the second lens E2 is a concave surface, and an image-side surface S4 of the second lens E2 is a convex surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The optical filter E7 has an object-side surface S13 and an image-side surface S14. Light from an object passes through the surfaces S1 to S14 sequentially and finally forms an image on the image plane S15.

In this example, the total effective focal length f of the optical imaging lens assembly is 1.97 mm, the total track length TTL of the optical imaging lens assembly is 5.76 mm, half of the diagonal length of the effective pixel area on the image plane S15 of the optical imaging lens assembly ImgH is 3.05 mm, half of the maximal field-of-view Semi-FOV of the optical imaging lens assembly is 61.3°, and the aperture value of the optical imaging lens assembly Fno is 2.28.

Table 5 shows a table of basic parameters of the optical imaging lens assembly in Embodiment 3. The radius of curvature, the thickness/distance and the focal length are shown in millimeters (mm). Table 6-1 and 6-2 show the high-order coefficients applicable to the aspheric surfaces in Embodiment 3. Each aspheric surface type may be defined by the formula (1) given in the above Embodiment 1.

TABLE 5

| surface number | surface type | radius of curvature | thickness/ distance | refractive index | abbe number | focal length | come coefficient |
|---|---|---|---|---|---|---|---|
| OBJ | spherical | infinite | infinite | | | | |
| S1 | aspheric | −2.1551 | 0.5368 | 1.55 | 56.1 | −14.13 | −15.2005 |
| S2 | aspheric | −3.2528 | 0.3125 | | | | −99.0000 |
| S3 | aspheric | −13.1893 | 0.2186 | 1.55 | 56.1 | −29.78 | 99.0000 |
| S4 | aspheric | −70.0000 | 0.4407 | | | | −99.0000 |
| STO | spherical | infinite | 0.0514 | | | | |
| S5 | aspheric | 10.0023 | 0.8781 | 1.55 | 56.1 | 2.27 | −25.7750 |
| S6 | aspheric | −1.3749 | 0.1075 | | | | 0.7675 |
| S7 | aspheric | 4.8027 | 0.2378 | 1.68 | 19.2 | −10.73 | −54.1707 |
| S8 | aspheric | 2.8375 | 0.3040 | | | | −6.5689 |
| S9 | aspheric | −3.4428 | 1.0567 | 1.55 | 56.1 | 2.01 | −71.4846 |
| S10 | aspheric | −0.9226 | 0.1000 | | | | −1.2463 |
| S11 | aspheric | 1.9527 | 0.4600 | 1.67 | 20.4 | −2.26 | −0.6392 |
| S12 | aspheric | 0.7700 | 0.5590 | | | | −0.9926 |
| S13 | spherical | infinite | 0.1100 | 1.52 | 64.2 | | |
| S14 | spherical | infinite | 0.3913 | | | | |
| S15 | spherical | infinite | | | | | |

TABLE 6-1

| surface number | A4 | A6 | A8 | A10 | A12 | A14 | A16 |
|---|---|---|---|---|---|---|---|
| S1 | 1.3323E−01 | −8.7240E−02 | 5.4725E−02 | −2.6624E−02 | 9.9175E−03 | −2.6833E−03 | 4.8065E−04 |
| S2 | 1.0761E−01 | 6.0047E−01 | −2.6913E+00 | 7.0638E+00 | −1.2492E+01 | 1.5345E+01 | −1.3092E+01 |
| S3 | 3.1924E−01 | −1.4332E+00 | 8.3322E+00 | −3.7767E+01 | 1.2807E+02 | −3.1540E+02 | 5.6046E+02 |

TABLE 6-1-continued

| surface number | A4 | A6 | A8 | A10 | A12 | A14 | A16 |
|---|---|---|---|---|---|---|---|
| S4 | 2.8125E−01 | −2.8609E+00 | 3.7094E+01 | −3.1861E+02 | 1.9042E+03 | −8.0756E+03 | 2.4699E+04 |
| S5 | −1.1118E−01 | 8.6517E+00 | −4.6387E+02 | 1.4290E+04 | −2.8043E+05 | 3.7062E+06 | −3.4140E+07 |
| S6 | 1.0740E−01 | −6.6450E+00 | 1.0803E+02 | −1.1212E+03 | 8.1572E+03 | −4.2827E+04 | 1.6465E+05 |
| S7 | −3.6367E−02 | −3.3854E+00 | 2.9724E+01 | −1.7375E+02 | 7.6124E+02 | −2.5416E+03 | 6.4508E+03 |
| S8 | 1.1797E−01 | −2.1096E+00 | 1.0199E+01 | −3.2170E+01 | 7.3982E+01 | −1.2798E+02 | 1.6813E+02 |
| S9 | 6.9390E−02 | −2.4941E−01 | 1.9942E−01 | 8.7664E−01 | −3.0762E+00 | 5.2030E+00 | −5.7912E+00 |
| S10 | 4.3122E−01 | −1.5032E+00 | 4.2355E+00 | −9.0884E+00 | 1.4573E+01 | −1.7323E+01 | 1.5321E+01 |
| S11 | −1.2678E−01 | −7.5960E−01 | 2.3867E+00 | −4.4547E+00 | 5.8302E+00 | −5.4895E+00 | 3.7532E+00 |
| S12 | −7.9652E−01 | 1.0477E+00 | −1.2705E+00 | 1.2221E+00 | −8.7910E−01 | 4.6620E−01 | −1.8229E−01 |

TABLE 6-2

| surface number | A18 | A20 | A22 | A24 | A26 | A28 | A30 |
|---|---|---|---|---|---|---|---|
| S1 | −5.0152E−05 | 2.3091E−06 | 0.0000E+00 | 6.0000E+00 | 0.0000E+00 | 0.0000E+00 | 0.0000E+00 |
| S2 | 7.6595E+00 | −3.0003E+00 | 7.5057E−01 | −1.0833E−01 | 6.8622E−03 | 0.0000E+00 | 0.0000E+00 |
| S3 | −7.1965E+02 | 6.6604E+02 | −4.3882E+02 | 2.0015E+02 | −5.9838E+01 | 1.0494E+01 | −8.1226E−01 |
| S4 | −5.4990E+04 | 8.9134E+04 | −1.0401E+05 | 8.5034E+04 | −4.6193E+04 | 1.4964E+04 | −2.1863E+03 |
| S5 | 2.2340E+08 | −1.0447E+09 | 3.4666E+09 | −7.9690E+09 | 1.2064E+10 | −1.0815E+10 | 4.3482E+09 |
| S6 | −4.6645E+05 | 9.7113E+05 | −1.4662E+06 | 1.5600E+06 | −1.1080E+06 | 4.7106E+05 | −9.0594E+04 |
| S7 | −1.2361E+04 | 1.7679E+04 | −1.8510E+04 | 1.3736E+04 | −6.8257E+03 | 2.0331E+03 | −2.7395E+02 |
| S8 | −1.6776E+02 | 1.2608E+02 | −7.0323E+01 | 2.8271E+01 | −7.7665E+00 | 1.3094E+00 | −1.0253E−01 |
| S9 | 4.6172E+00 | −27119E+00 | 1.1707E+00 | −3.6135E−01 | 7.5283E−02 | −9.4522E−03 | 5.3847E−04 |
| S10 | −1.0104E+01 | 4.9433E+00 | −1.7657E+00 | 4.4640E−01 | −7.5501E−02 | 7.6467E−03 | −3.5002E−04 |
| S11 | −1.8711E+00 | 6.7842E−01 | −1.7666E−01 | 3.2145E−02 | −3.8755E−03 | 2.7790E−04 | −8.9645E−06 |
| S12 | 5.2577E−02 | −1.1133E−02 | 1.7063E−03 | −1.8400E−04 | 1.3227E−05 | −5.6868E−07 | 1.1056E−08 |

Figure 6C:
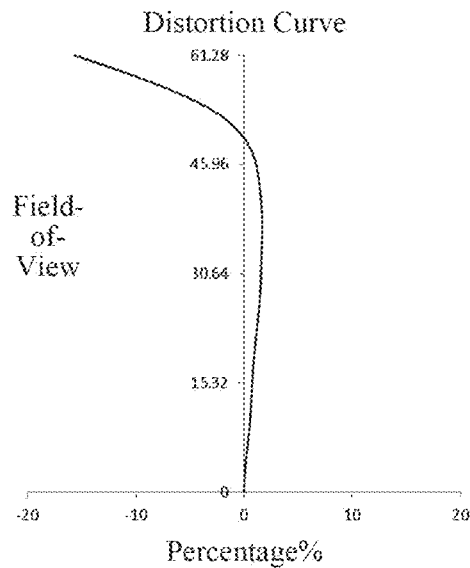
Figure 6D:
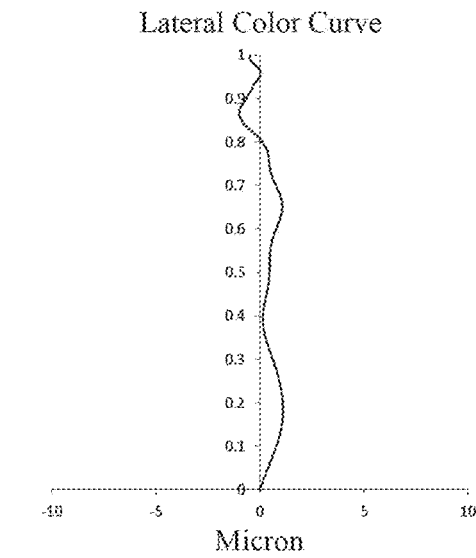

FIG. 6A shows the longitudinal aberration curve of the optical imaging lens assembly according to Embodiment 3, representing deviations of focal points where lights of different wavelengths converged after passing through the lens assembly. FIG. 6B shows the astigmatic curve of the optical imaging lens assembly according to Embodiment 3, representing a curvature of the tangential image plane and a curvature of the sagittal image plane. FIG. 6C shows the distortion curve of the optical imaging lens assembly according to Embodiment 3, representing amounts of distortion at different viewing angles. FIG. 6D shows the lateral color curve of the optical imaging lens assembly according to Embodiment 3, representing deviations of different image heights on the image plane after lights pass through the lens assembly. It can be seen from FIG. 6A to FIG. 6D that the optical imaging lens assembly given in Embodiment 3 can achieve a good imaging quality.

Embodiment 4

Figure 7:
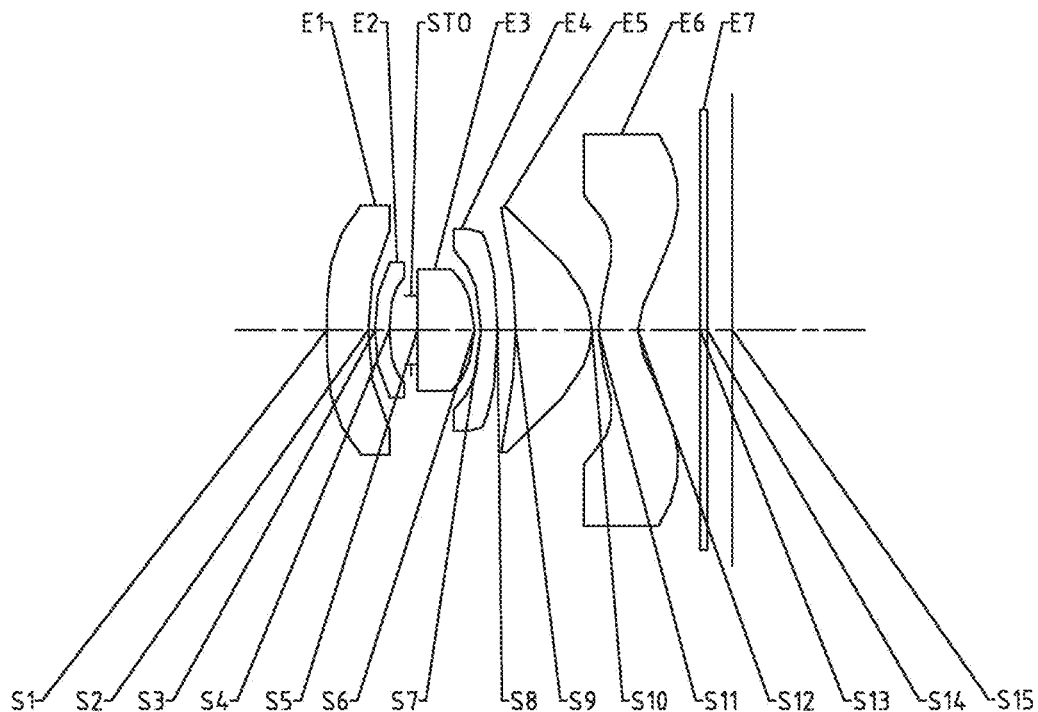
FIG. 7 is a schematic structural diagram illustrating an optical imaging lens assembly according to Embodiment 4 of the present disclosure.

An optical imaging lens assembly according to Embodiment 4 of the present disclosure is described below with reference to FIGS. 7-8D. FIG. 7 is a schematic structural diagram illustrating the optical imaging lens assembly according to Embodiment 4 of the present disclosure.

As shown in FIG. 7, the optical imaging lens assembly from an object side to an image side sequentially includes a first lens E1, a second lens E2, a diaphragm STO, a third lens E3, a fourth lens E4, a fifth lens E5, a sixth lens E6, an optical filter E7 and an image plane S15.

The first lens E1 has a negative refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a convex surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The optical filter E7 has an object-side surface S13 and an image-side surface S14. Light from an object passes through the surfaces S1 to S14 sequentially and finally forms an image on the image plane S15.

In this example, the total effective focal length f of the optical imaging lens assembly is 2.39 mm, the total track length TTL of the optical imaging lens assembly is 6.31 mm, half of the diagonal length of the effective pixel area on the image plane S15 of the optical imaging lens assembly ImgH is 3.63 mm, half of the maximal field-of-view of the optical imaging lens assembly Semi-FOV is 62.2°, and the aperture value of the optical imaging lens assembly Fno is 2.28.

Table 7 shows a table of basic parameters of the optical imaging lens assembly in Embodiment 4. The radius of curvature, the thickness/distance and the focal length are shown in millimeters (mm). Table 8-1 and 8-2 show the high-order coefficients applicable to the aspheric surfaces in Embodiment 4. Each aspheric surface type may be defined by the formula (1) given in the above Embodiment 1.

TABLE 7

| surface number | surface type | radius of curvature | thickness/ distance | Material refractive index | abbe number | focal length | conic coefficient |
|---|---|---|---|---|---|---|---|
| OBJ | spherical | infinite | infinite | | | | |
| S1 | aspheric | 52.0020 | 0.6438 | 1.55 | 56.1 | −205.01 | 0.0000 |
| S2 | aspheric | 35.3613 | 0.1062 | | | | 0.0000 |
| S3 | aspheric | 6.5340 | 0.2200 | 1.55 | 56.1 | −9.35 | 0.0000 |
| S4 | aspheric | 2.8324 | 0.3401 | | | | 0.0000 |
| STO | spherical | infinite | 0.1000 | | | | |
| S5 | aspheric | 17.4750 | 0.8895 | 1.55 | 56.1 | 2.59 | 0.0000 |
| S6 | aspheric | −1.5148 | 0.1000 | | | | 0.0000 |
| S7 | aspheric | −3.3243 | 0.2553 | 1.68 | 19.2 | −5.25 | 0.0000 |
| S8 | aspheric | −50.0000 | 0.2821 | | | | 0.0000 |
| S9 | aspheric | −6.3697 | 1.1866 | 1.55 | 56.1 | 2.15 | 0.0000 |
| S10 | aspheric | −1.0580 | 0.1000 | | | | −1.0000 |
| S11 | aspheric | 1.7956 | 0.6183 | 1.67 | 20.4 | −3.54 | −1.0000 |
| S12 | aspheric | 0.8794 | 0.9646 | | | | −1.0000 |
| S13 | spherical | infinite | 0.1100 | 1.52 | 64.2 | | |
| S14 | spherical | infinite | 0.3928 | | | | |
| S15 | spherical | infinite | | | | | |

TABLE 8-1

| surface number | A4 | A6 | A8 | A10 | A12 | A14 | A16 |
|---|---|---|---|---|---|---|---|
| S1 | 6.4509E−02 | −6.7108E−02 | 2.0399E−01 | −4.3066E−01 | 6.0081E−01 | −5.7881E−01 | 3.9598E−01 |
| S2 | 1.9936E−01 | −3.1095E−01 | 1.7173E+00 | −7.0598E+00 | 1.8178E+01 | −3.1434E+01 | 3.8042E+01 |
| S3 | 3.6596E−01 | −2.4656E+00 | 2.1938E+01 | −1.2813E+02 | 4.9928E+02 | −1.3545E+03 | 2.6278E+03 |
| S4 | 5.9184E−02 | 5.8858E+00 | −1.3902E+02 | 1.9928E+03 | −1.8657E+04 | 1.1944E+05 | −5.3826E−05 |
| S5 | 3.8466E−03 | −1.5969E+00 | 6.3644E+01 | −1.4359E+03 | 2.0354E+04 | −1.9338E+05 | 1.2792E−06 |
| S6 | 2.8562E−01 | −3.7192E+00 | 3.0829E+01 | −1.6600E+02 | 5.9511E+02 | −1.4618E+03 | 2.4690E+03 |
| S7 | 5.6670E−02 | −2.1423E+00 | 1.6846E+01 | −7.9473E+01 | 2.4686E+02 | −5.3598E+02 | 8.4535E+02 |
| S8 | −1.5134E−01 | 7.9554E−02 | 4.7064E+00 | −1.1523E+00 | −7.8671E−01 | 8.0034E+00 | −1.7236E+01 |
| S9 | 4.3184E−02 | −1.3422E−01 | 1.5993E−01 | 2.6523E−02 | −3.1604E−02 | 4.4345E−01 | −3.4508E−01 |
| S10 | 2.9874E−01 | −8.6004E−01 | 1.7430E+00 | −2.5589E+00 | 2.7434E+00 | −2.1727E+00 | 1.2894E+00 |
| S11 | 4.6595E−02 | −4.3798E−01 | 6.2627E−01 | −5.5057E−01 | 3.2091E−01 | −1.1839E−01 | 2.1155E−02 |
| S12 | −3.1683E−01 | 1.3225E−01 | −2.4205E−02 | −1.2927E−02 | 1.3019E−02 | −5.8468E−03 | 1.6973E−03 |

TABLE 8-2

| surface number | A18 | A20 | A22 | A24 | A26 | A28 | A30 |
|---|---|---|---|---|---|---|---|
| S1 | −1.9509E−01 | 6.9389E−02 | −1.7650E−02 | 3.1307E−03 | −3.6796E−04 | 2.5773E−05 | −8.1541E−07 |
| S2 | −3.2921E+01 | 2.0520E+01 | −9.1514E+00 | 2.8519E+00 | −5.9025E−01 | 7.2923E−02 | −4.0703E−03 |
| S3 | −3.6914E+03 | 3.7513E+03 | −2.7169E+03 | 1.3565E+03 | −4.3819E+02 | 8.0747E+01 | −6.1994E+00 |
| S4 | 1.7347E+06 | −4.0146E+06 | 6.6149E+06 | −7.5688E+06 | 5.7121E+06 | −2.5551E+06 | 5.1273E+05 |
| S5 | −6.0126E+06 | 2.0206E+07 | −4.8198E+07 | 7.9643E+07 | −8.6632E+07 | 5.5762E+07 | −1.6081E+07 |
| S6 | −2.7492E+03 | 1.6793E+03 | 9.1599E+01 | −1.1507E+03 | 1.0016E+03 | −4.0199E+02 | 6.5608E+01 |
| S7 | −9.9004E+02 | 8.6713E+02 | −5.6323E+02 | 2.6394E+02 | −8.4398E+01 | 1.6467E+01 | −1.4773E+00 |
| S8 | 2.0939E+01 | −1.6494E+01 | 8.7551E+00 | −3.1210E+00 | 7.1764E−01 | −9.6233E−02 | 5.7136E−03 |
| S9 | 1.7463E−01 | −6.0225E−02 | 1.4237E−02 | −2.2514E−03 | 2.2384E−04 | −1.2233E−05 | 2.5937E−07 |
| S10 | −5.7935E−01 | 1.9692E−01 | −4.9805E−02 | 9.0462E−03 | −1.1088E−03 | 8.1701E−05 | −2.7218E−06 |
| S11 | 2.7039E−03 | −2.7823E−03 | 8.1935E−04 | −1.3672E−04 | 1.3751E−05 | −7.8000E−07 | 1.9245E−08 |
| S12 | −3.4381E−04 | 4.9634E−05 | −5.0911E−06 | 3.6249E−07 | −1.7021E−08 | 4.7342E−10 | −5.9002E−12 |

Figure 8A:
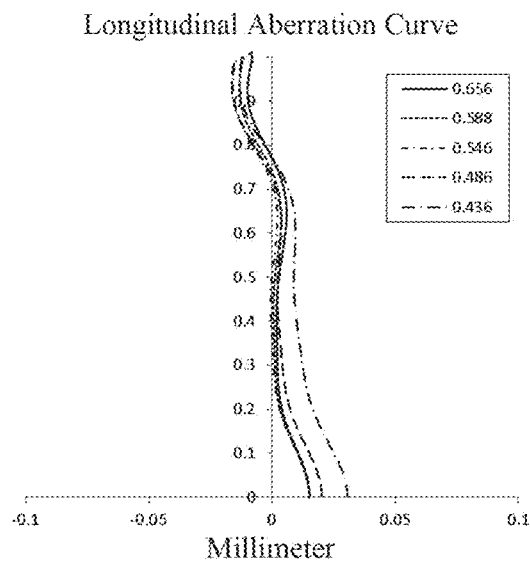
FIGS. 8A-8D respectively illustrate a longitudinal aberration curve, an astigmatic curve, a distortion curve and a lateral color curve of the optical imaging lens assembly according to Embodiment 4.
Figure 8B:
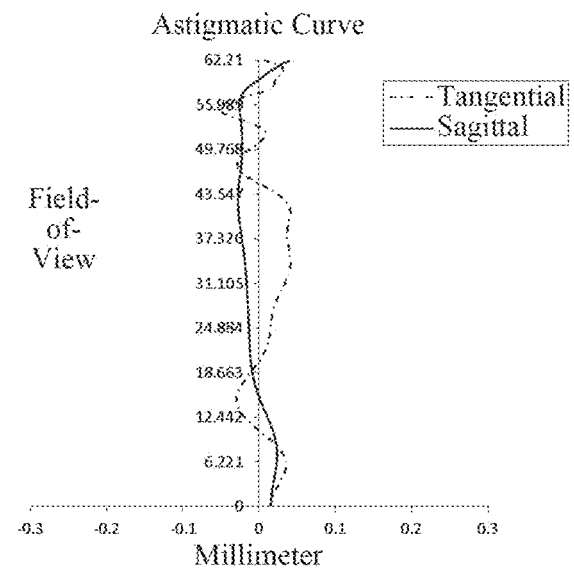
Figure 8C:
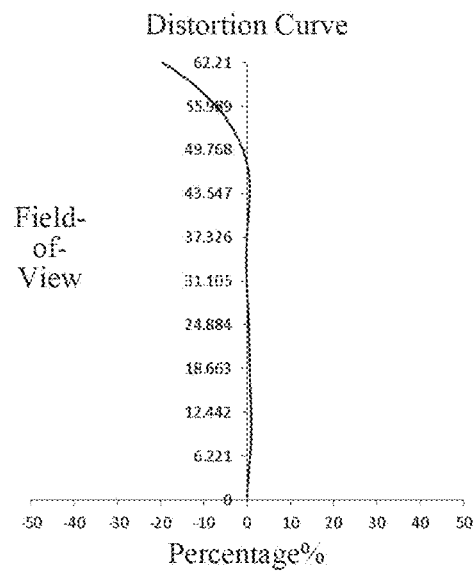
Figure 8D:
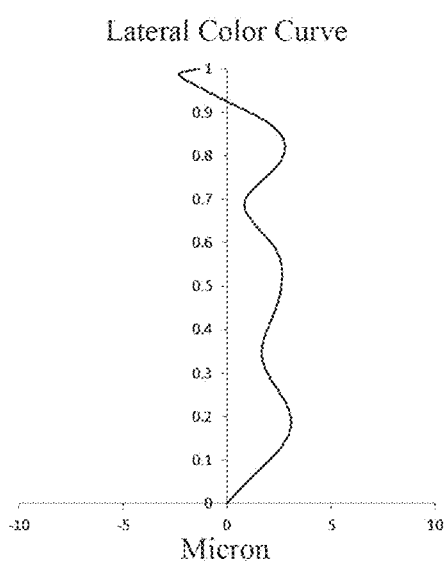

FIG. 8A shows the longitudinal aberration curve of the optical imaging lens assembly according to Embodiment 4, representing deviations of focal points where lights of different wavelengths converged after passing through the lens assembly. FIG. 8B shows the astigmatic curve of the optical imaging lens assembly according to Embodiment 4, representing a curvature of the tangential image plane and a curvature of the sagittal image plane. FIG. 8C shows the distortion curve of the optical imaging lens assembly according to Embodiment 4, representing amounts of distortion at different viewing angles. FIG. 8D shows the lateral color curve of the optical imaging lens assembly according to Embodiment 4, representing deviations of different image heights on the image plane after light passes through the lens assembly. It can be seen from FIG. 8A to FIG. 8D that the optical imaging lens assembly given in Embodiment 4 can achieve a good imaging quality.

Embodiment 5

Figure 9:
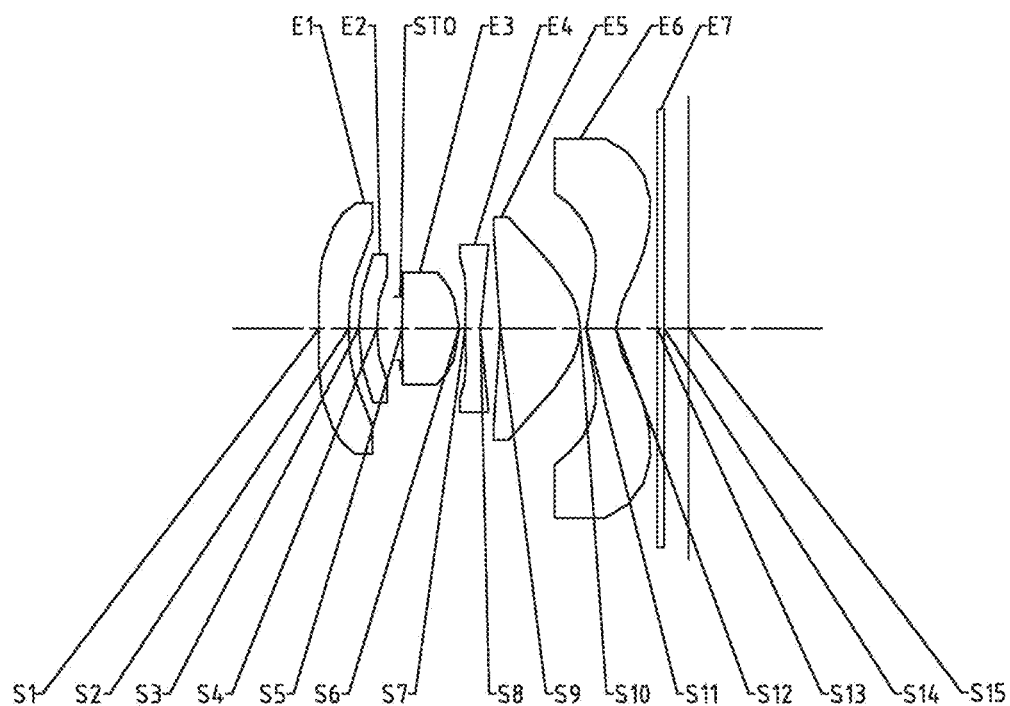
FIG. 9 is a schematic structural diagram illustrating an optical imaging lens assembly according to Embodiment 5 of the present disclosure.

An optical imaging lens assembly according to Embodiment 5 of the present disclosure is described below with reference to FIGS. 9-10D. FIG. 9 is a schematic structural diagram illustrating the optical imaging lens assembly according to Embodiment 5 of the present disclosure.

As shown in FIG. 9, the optical imaging lens assembly from an object side to an image side sequentially includes a first lens E1, a second lens E2, a diaphragm STO, a third lens E3, a fourth lens E4, a fifth lens E5, a sixth lens E6, an optical filter E7 and an image plane S15.

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S1 of the sixth lens E6 is a convex surface, and an image-side surface S12 of the sixth lens E6 is a concave surface. The optical filter E7 has an object-side surface S13 and an image-side surface S14. Light from an object passes through the surfaces S1 to S14 sequentially and finally forms an image on the image plane S15.

In this example, the total effective focal length f of the optical imaging lens assembly is 2.16 mm, the total track length TTL of the optical imaging lens assembly is 5.92 mm half of the diagonal length of the effective pixel area on the image plane S15 of the optical imaging lens assembly ImgH is 3.63 mm, half of the maximal field-of-view Semi-FOV of the optical imaging lens assembly is 61.00, and the aperture value of the optical imaging lens assembly Fno is 2.28.

Table 9 shows a table of basic parameters of the optical imaging lens assembly in Embodiment 5. The radius of curvature, the thickness/distance and the focal length are shown in millimeters (mm). Table 10-1 and 10-2 show the high-order coefficients applicable to the aspheric surfaces in Embodiment 5. Each aspheric surface type may be defined by the formula (1) given in the above Embodiment 1.

TABLE 9

| surface number | surface type | radius of curvature | thickness/ distance | Material refractive index | abbe number | focal length | conic coefficient |
|---|---|---|---|---|---|---|---|
| OBJ | spherical | infinite | infinite | | | | |
| S1 | aspheric | −7.8583 | 0.4755 | 1.55 | 56.1 | −7.36 | −98.9985 |
| S2 | aspheric | 8.4136 | 0.1583 | | | | −98.8020 |
| S3 | aspheric | 3.1996 | 0.2963 | 1.55 | 56.1 | 22.18 | −82.1050 |
| S4 | aspheric | 4.2049 | 0.3731 | | | | −11.9632 |
| STO | spherical | infinite | 0.0296 | | | | |
| S5 | aspheric | 18.4321 | 0.9117 | 1.55 | 56.1 | 2.52 | −14.8982 |
| S6 | aspheric | −1.4610 | 0.1000 | | | | 0.6439 |
| S7 | aspheric | 7.8908 | 0.2400 | 1.68 | 19.2 | −7.06 | −92.0069 |
| S8 | aspheric | 2.9456 | 0.3207 | | | | −6.2359 |
| S9 | aspheric | −5.8814 | 1.2799 | 1.55 | 56.1 | 1.91 | −10.2698 |
| S10 | aspheric | −0.9564 | 0.1000 | | | | −1.0400 |
| S11 | aspheric | 1.6053 | 0.4685 | 1.67 | 20.4 | −2.65 | −1.0216 |
| S12 | aspheric | 0.7427 | 0.6657 | | | | −1.0004 |
| S13 | spherical | infinite | 0.1100 | 1.52 | 64.2 | | |
| S14 | spherical | infinite | 0.3925 | | | | |
| S15 | spherical | infinite | | | | | |

TABLE 10-1

| surface number | A4 | A6 | A8 | A10 | A12 | A14 | A16 |
|---|---|---|---|---|---|---|---|
| S1 | 1.1304E−01 | −1.0688E−01 | 2.1876E−01 | −4.2830E−01 | 6.1949E−01 | −6.4647E−01 | 4.8975E−01 |
| S2 | 1.6065E−01 | −2.3367E−01 | 1.9052E+00 | −8.1627E+00 | 2.1303E+01 | −3.7511E+01 | 4.6056E+01 |
| S3 | 1.5830E−01 | 2.0453E−01 | −1.9015E+00 | 1.0418E+01 | −4.6121E+01 | 1.5673E+02 | −3.9420E+02 |
| S4 | 2.1997E−01 | −5.5728E+00 | 1.0757E+02 | −1.1910E+03 | 8.6725E+03 | −4.3869E+04 | 1.5864E+05 |
| S5 | 4.1606E−02 | −3.5662E+00 | 1.2502E+02 | −3.3000E+03 | 6.1666E+04 | −8.0044E+05 | 7.2433E+06 |
| S6 | 1.8473E−01 | −3.5838E+00 | 4.3870E+01 | −3.7186E+02 | 2.1888E+03 | −9.0797E+03 | 2.6997E+04 |
| S7 | 5.4695E−02 | −2.1565E+00 | 1.5566E+01 | −7.7602E+01 | 2.7912E+02 | −7.2821E+02 | 1.3885E+03 |
| S8 | −4.6547E−02 | −3.7655E−01 | 1.7492E+00 | −5.3240E+00 | 1.2742E+01 | −2.3417E+01 | 3.2263E+01 |
| S9 | 3.6071E−02 | −5.4127E−02 | −4.0999E−01 | 2.4360E+00 | −6.7826E+00 | 1.1857E+01 | −1.4034E+01 |
| S10 | 2.8916E−01 | −7.4394E−01 | 1.5006E+00 | −2.3651E+00 | 2.9183E+00 | −2.8059E+00 | 2.1060E+00 |
| S11 | −5.7165E−02 | −4.8316E−01 | 1.0145E+00 | −1.3865E+00 | 1.4329E+00 | −1.1204E+00 | 6.5102E−01 |
| S12 | −5.3965E−01 | 4.0453E−01 | −2.8650E−01 | 1.8434E−01 | −9.8764E−02 | 4.0836E−02 | −1.2574E−02 |

TABLE 10-2

| surface number | A18 | A20 | A22 | A24 | A26 | A28 | A30 |
|---|---|---|---|---|---|---|---|
| S1 | −2.7065E−01 | 1.0883E−01 | −3.1440E−02 | 6.3443E−03 | −8.4760E−04 | 6.7263E−05 | −2.3973E−06 |
| S2 | −4.0052E+01 | 2.4802E+01 | −1.0864E+01 | 3.2885E+00 | −6.5436E−01 | 7.7003E−02 | −4.0601E−03 |
| S3 | 7.1577E+02 | −9.2486E+02 | 8.3844E+02 | −5.2012E+02 | 2.1010E+02 | −4.9773E+01 | 5.2458E+00 |
| S4 | −4.1597E+05 | 7.9271E+05 | −1.0872E+06 | 1.0458E+06 | −6.6958E+05 | 2.5633E+05 | −4.4392E+04 |
| S5 | −4.6058E+07 | 2.0625E+08 | −6.4480E+08 | 1.3722E+09 | −1.8860E+09 | 1.5004E+09 | −5.2035E+08 |
| S6 | −5.8144E+04 | 9.0778E+04 | −1.0162E+05 | 7.9402E+04 | −4.1055E+04 | 1.2602E+04 | −1.7355E+03 |
| S7 | −4.9440E+03 | 1.9928E+03 | −1.4751E+03 | 7.6559E+02 | −2.6358E+02 | 5.3892E+01 | −4.9355E+00 |
| S8 | −3.3007E+01 | 2.4867E+01 | −1.3579E+01 | 5.2137E+00 | −1.3309E+00 | 2.0221E−01 | −1.3795E−02 |
| S9 | 1.1595E+01 | −6.7559E+00 | 2.7602E+00 | −7.7226E−01 | 1.4051E−01 | −1.4916E−02 | 6.9669E−04 |
| S10 | −1.2443E+00 | 5.8151E−01 | −2.1190E−01 | 5.7671E−02 | −1.0861E−02 | 1.2430E−03 | −6.4349E−05 |
| S11 | −2.7769E−01 | 8.6096E−02 | −1.9118E−02 | 2.9580E−03 | −3.0270E−04 | 1.8410E−05 | −5.0398E−07 |
| S12 | 2.8449E−03 | −4.6891E−04 | 5.5504E−05 | −4.5895E−06 | 2.5144E−07 | −8.1964E−09 | 1.2028E−10 |

Figures 10A, 10B:
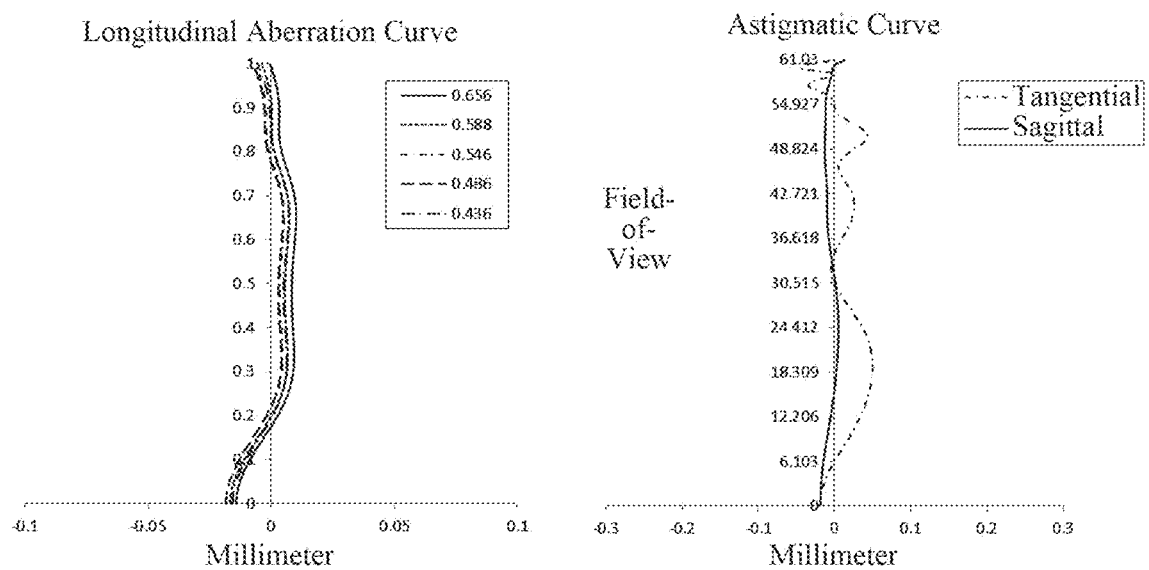

FIG. 10A shows the longitudinal aberration curve of the optical imaging lens assembly according to Embodiment 5, representing deviations of focal points where lights of different wavelengths converged after passing through the lens assembly. FIG. 10B shows the astigmatic curve of the optical imaging lens assembly according to Embodiment 5, representing a curvature of the tangential image plane and a curvature of the sagittal image plane. FIG. 10C shows the distortion curve of the optical imaging lens assembly according to Embodiment 5, representing amounts of distortion at different viewing angles. FIG. 10D shows the lateral color curve of the optical imaging lens assembly according to Embodiment 5, representing deviations of different image heights on the image plane after light passes through the lens assembly. It can be seen from FIG. 10A to FIG. 10D that the optical imaging lens assembly given in Embodiment 5 can achieve a good imaging quality.

To sum up, Embodiment 1 to Embodiment 5 respectively satisfy the relationships shown in Table 11 below.

TABLE 11

| Conditional expression/ embodiment | 1 | 2 | 3 | 4 | 5 |
|---|---|---|---|---|---|
| CT3/T12 | 10.09 | 3.56 | 2.81 | 8.38 | 5.76 |
| R5/R9 | −2.15 | −2.65 | −2.91 | −2.74 | −3.13 |
| CT5/CT2 | 4.82 | 5.00 | 4.83 | 5.39 | 4.32 |
| CT6/T56 | 4.56 | 5.00 | 4.60 | 6.18 | 4.69 |
| T23/CT2 | 1.47 | 1.88 | 2.25 | 2.00 | 1.36 |
| R9/f5 | −2.87 | −1.94 | −1.71 | −2.96 | −3.07 |
| R11/f6 | −0.50 | −1.06 | −0.87 | −0.51 | −0.61 |
| f4/f3 | −2.33 | −4.50 | −4.72 | −2.03 | −2.80 |
| TTL/ImgH | 1.63 | 1.61 | 1.89 | 1.74 | 1.63 |
| T23/(T34 + T56) | 2.28 | 2.07 | 2.37 | 2.20 | 2.01 |

The present disclosure further provides an imaging apparatus, having an electronic photosensitive element which may be a photosensitive charge-coupled device (CCD) or a complementary metal-oxide semiconductor (CMOS) element. The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar function.

The invention claimed is:

1. An optical imaging lens assembly, along an optical axis from an object side to an image side, sequentially comprising:
   a first lens having a refractive power;
   a second lens having a refractive power;
   a third lens having a refractive power, an object-side surface of the third lens being a convex surface;
   a fourth lens having a negative refractive power;
   a fifth lens having a refractive power, an object-side surface of the fifth lens being a concave surface; and
   a sixth lens having a refractive power;
   half of a maximal field-of-view Semi-FOV of the optical imaging lens assembly satisfying: Semi-FOV≥60°;
   a center thickness CT3 of the third lens on the optical axis and a spacing distance T12 between the first lens and the second lens on the optical axis satisfying: 2.5<CT3/T12<10.5;
   a radius of curvature R5 of the object-side surface of the third lens and a radius of curvature R9 of the object-side surface of the fifth lens satisfying: −3.5<R5/R9<−2.0; and
   a spacing distance T23 between the second lens and the third lens on the optical axis, a spacing distance T34 between the third lens and the fourth lens on the optical axis, and a spacing distance T56 between the fifth lens and the sixth lens on the optical axis satisfy: 2.20≤T23/(T34+T56)<2.5.

2. The optical imaging lens assembly according to claim 1, wherein a center thickness CT6 of the sixth lens on the optical axis and a spacing distance T56 between the fifth lens and the sixth lens on the optical axis satisfy: 4.5<CT6/T56<6.5.

3. The optical imaging lens assembly according to claim 1, wherein a spacing distance T23 between the second lens and the third lens on the optical axis and a center thickness CT2 of the second lens on the optical axis satisfy: 1.0<T23/CT2<2.5.

4. The optical imaging lens assembly according to claim 1, wherein the radius of curvature R9 of the object-side surface of the fifth lens and an effective focal length f5 of the fifth lens satisfy: −3.5<R9/f5<−1.5.

5. The optical imaging lens assembly according to claim 1, wherein a radius of curvature R11 of an object-side surface of the sixth lens and an effective focal length f6 of the sixth lens satisfy: $-1.5 < R11/f6 \leq -0.5$.

6. The optical imaging lens assembly according to claim 1, wherein an effective focal length f3 of the third lens and an effective focal length f4 of the fourth lens satisfy: $-5.0 < f4/f3 < -2.0$.

7. The optical imaging lens assembly according to claim 1, wherein a distance TTL from an object-side surface of the first lens to an image plane of the optical imaging lens assembly on the optical axis and half of a diagonal length ImgH of an effective pixel area on the image plane of the optical imaging lens assembly satisfy: $1.5 < TTL/ImgH < 2.0$.

8. The optical imaging lens assembly according to claim 1, wherein a center thickness CT5 of the fifth lens on the optical axis and a center thickness CT2 of the second lens on the optical axis satisfying $4.82 \leq CT5/CT2 < 5.5$.

9. An optical imaging lens assembly, along an optical axis from an object side to an image side, sequentially comprising:
 a first lens having a refractive power;
 a second lens having a refractive power;
 a third lens having a refractive power, an object-side surface of the third lens being a convex surface;
 a fourth lens having a negative refractive power;
 a fifth lens having a refractive power, an object-side surface of the fifth lens being a concave surface;
 a sixth lens having a refractive power;
 a center thickness CT5 of the fifth lens on the optical axis and a center thickness CT2 of the second lens on the optical axis satisfying: $4.3 < CT5/CT2 < 5.5$; and
 a spacing distance T23 between the second lens and the third lens on the optical axis, a spacing distance T34 between the third lens and the fourth lens on the optical axis, and a spacing distance T56 between the fifth lens and the sixth lens on the optical axis satisfy: $2.20 \leq T23/(T34+T56) < 2.5$.

10. The optical imaging lens assembly according to claim 9, wherein half of a maximal field-of-view Semi-FOV of the optical imaging lens assembly satisfies: Semi-FOV$\geq 60°$.

11. The optical imaging lens assembly according to claim 9, wherein a center thickness CT3 of the third lens on the optical axis and a spacing distance T12 between the first lens and the second lens on the optical axis satisfy: $2.5 < CT3/T12 < 10.5$.

12. The optical imaging lens assembly according to claim 9, wherein a radius of curvature R5 of the object-side surface of the third lens and a radius of curvature R9 of the object-side surface of the fifth lens satisfy: $-3.5 < R5/R9 < -2.0$.

13. The optical imaging lens assembly according to claim 9, wherein a center thickness CT6 of the sixth lens on the optical axis and a spacing distance T56 between the fifth lens and the sixth lens on the optical axis satisfy: $4.5 < CT6/T56 < 6.5$.

14. The optical imaging lens assembly according to claim 9, wherein a spacing distance T23 between the second lens and the third lens on the optical axis and the center thickness CT2 of the second lens on the optical axis satisfy: $1.0 < T23/CT2 < 2.5$.

15. The optical imaging lens assembly according to claim 9, wherein a radius of curvature R9 of the object-side surface of the fifth lens and an effective focal length f5 of the fifth lens satisfy: $-3.5 < R9/f5 < -1.5$.

16. The optical imaging lens assembly according to claim 9, wherein a radius of curvature R11 of an object-side surface of the sixth lens and an effective focal length f6 of the sixth lens satisfy: $-1.5 < R11/f6 \leq -0.5$.

17. The optical imaging lens assembly according to claim 9, wherein an effective focal length f3 of the third lens and an effective focal length f4 of the fourth lens satisfy: $-5.0 < f4/f3 < -2.0$.

18. The optical imaging lens assembly according to claim 9, wherein a distance TTL from an object-side surface of the first lens to an image plane of the optical imaging lens assembly on the optical axis and half of a diagonal length ImgH of an effective pixel area on the image plane of the optical imaging lens assembly satisfy: $1.5 < TTL/ImgH < 2.0$.

* * * * *